United States Patent
Chen et al.

(10) Patent No.: US 7,560,856 B2
(45) Date of Patent: Jul. 14, 2009

(54) HARVESTING ENERGY FROM FLOWING FLUID

(75) Inventors: Kuo Chiang Chen, Lexington, MA (US); Jahir A. Pabon, Wellesley, MA (US); Partha Ganguly, Belmont, MA (US); Murat Ocalan, Boston, MA (US); Julio C. Guerrero, Cambridge, MA (US); Kevin J. Forbes, Houston, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/949,420

(22) Filed: Dec. 3, 2007

(65) Prior Publication Data
US 2009/0140604 A1    Jun. 4, 2009

(51) Int. Cl.
*H01L 41/08* (2006.01)

(52) U.S. Cl. .............................. 310/339; 310/800

(58) Field of Classification Search ................ 310/339, 310/800
See application file for complete search history.

(56) References Cited

U.S. PATENT DOCUMENTS

| | | | |
|---|---|---|---|
| 3,371,234 A | 2/1968 | Cady | |
| 3,938,020 A | 2/1976 | Bourke | |
| 3,970,877 A * | 7/1976 | Russell et al. | 310/339 |
| 4,300,218 A * | 11/1981 | Kruka et al. | 367/165 |
| 4,387,318 A | 6/1983 | Kolm et al. | |
| 4,442,372 A * | 4/1984 | Roberts | 310/339 |
| 5,223,763 A * | 6/1993 | Chang | 310/339 |
| 5,494,468 A | 2/1996 | Demarco, Jr. | |
| 5,839,508 A | 11/1998 | Tubel et al. | |
| 6,011,346 A * | 1/2000 | Buchanan et al. | 310/339 |
| 6,424,079 B1 * | 7/2002 | Carroll | 310/339 |
| 6,433,465 B1 | 8/2002 | McKnight et al. | |
| 6,504,258 B2 | 1/2003 | Schultz et al. | |
| 6,532,740 B1 | 3/2003 | Sullivan | |
| 6,768,214 B2 | 7/2004 | Schultz et al. | |
| 6,856,036 B2 | 2/2005 | Belinsky | |
| 6,984,902 B1 | 1/2006 | Huang et al. | |
| 7,116,036 B2 | 10/2006 | Balasubramaniam et al. | |
| 7,199,480 B2 | 4/2007 | Fripp | |
| 7,282,838 B2 * | 10/2007 | Zanella et al. | 310/339 |
| 2002/0157388 A1 * | 10/2002 | Seto et al. | 60/325 |
| 2003/0152469 A1 * | 8/2003 | Dante et al. | 417/413.2 |
| 2005/0134149 A1 | 6/2005 | Deng et al. | |

(Continued)

FOREIGN PATENT DOCUMENTS

GB    1116451    6/1968

(Continued)

*Primary Examiner*—Mark Budd
(74) *Attorney, Agent, or Firm*—Brigid Laffey; James McAleenan (57) ABSTRACT

Electrical energy is produced at a remote or close site by converting kinetic energy from fluid flow with membranes that generates electrical energy in response to deformation by the fluid flow passing though a piezo electric medium attached to the deforming membranes. Sets of membranes define variable fluid flow restrictors that oscillate due to interaction of the force of fluid flow and Bernoulli Effect. The device can be tuned to different flow regimes in order to enhance energy conversion efficiency. Each membrane may include one or more layers of piezoelectric material separated by insulating/stiffening layers. Further, the device may be mounted in a secondary flow path such as a side package or annular tube.

28 Claims, 8 Drawing Sheets

U.S. PATENT DOCUMENTS

| | | |
|---|---|---|
| 2006/0022555 A1 | 2/2006 | Balasubramaniam et al. |
| 2006/0063522 A1 | 3/2006 | McFarland |
| 2006/0130476 A1 | 6/2006 | Fitch et al. |
| 2006/0133733 A1 | 6/2006 | Koste et al. |
| 2006/0175937 A1 | 8/2006 | Clingman et al. |
| 2006/0232167 A1 * | 10/2006 | Jordan ........................ 310/324 |
| 2006/0243934 A1 * | 11/2006 | Chung et al. .................. 251/11 |

FOREIGN PATENT DOCUMENTS

| | | |
|---|---|---|
| WO | 2005036728 A1 | 4/2005 |
| WO | 2006093790 A2 | 9/2006 |
| WO | 2007071975 | 6/2007 |

* cited by examiner

HARVESTING ENERGY FROM FLOWING FLUID

FIELD OF THE INVENTION

This invention is generally related to harvesting energy, and more particularly to converting kinetic energy from flowing fluid into electrical energy to power equipment in a close or remote locations from the area where the energy is being harvested.

BACKGROUND OF THE INVENTION

In order to recover natural resources from subterranean formations it is often necessary to perform tasks related to exploration, monitoring, maintenance and construction in remote locations that are either difficult or impractical for personnel to reach directly. For example, boreholes may be drilled tens of thousands of meters into the earth, and in the case of offshore drilling, the borehole may be thousands of meters under water. One of the technical challenges to performing tasks in such remote locations is providing power to equipment. It is known to power downhole and undersea equipment via either stored energy or wireline connection to the surface. However, both of these techniques have disadvantages. For example, a wireline connection to the surface limits that distance at which the equipment can operate relative to the energy source, and may require a relatively significant portion of the limited volume of a borehole. Using stored energy avoids some of the disadvantages of a wireline connection to the surface, but relatively little energy can be stored in comparison to requirements because of size limitations. For example, the available volume in a borehole environment is small. Further, both wireline connection to the surface and stored energy techniques require the presence of operators, e.g., a surface vessel to either provide the wireline energy or recharge the energy storage means. Various techniques associated with energy production are described below.

U.S. Pat. No. 6,504,258, VIBRATION BASED DOWNHOLE POWER GENERATOR, describes a downhole power generator including a member that is vibrated in response to fluid flow through a housing. Vibration of the member causes a power generating assembly to generate electrical power.

U.S. Pat. No. 6,768,214, VIBRATION BASED POWER GENERATOR, describes using fluid flow through a fluid conduit to cause a member to displace or vibrate. The displacement of the member is utilized to induce strain in a piezoelectric material, thereby causing the piezoelectric material to produce electricity. Various means may be used to create turbulence in the fluid flow, thereby increasing displacement of the member, resulting in increased power output from the generator.

U.S. Pat. No. 5,839,508, DOWNHOLE APPARATUS FOR GENERATING ELECTRICAL POWER IN A WELL, describes electrical generating apparatus which connects to production tubing. In a preferred embodiment, this apparatus includes a housing having a primary flow passageway in communication with the production tubing. The housing also includes a laterally displaced side passageway communicating with the primary flow passageway such that production fluid passes upwardly towards the surface through the primary and side passageways. A flow diverter may be positioned in the housing to divert a variable amount of production fluid from the production tubing and into the side passageway.

U.S. Pat. No. 3,371,234, PIEZOELECTRIC VIBRATORS AND SYSTEMS EMBODYING THE SAME FOR CONVERTING THE MECHANICAL VIBRATION THEREOF INTO ELECTRIC ENERGY, describes use of mechanical vibrators of the piezoelectric-quartz-crystal type for converting mechanical vibrations into electric energy. The mechanical vibrators be used, for example, to detect the mechanical vibration or acceleration of a structure.

U.S. Pat. No. 4,387,318, PIEZO-ELECTRIC FLUID ELECTRIC GENERATOR, describes a device with a bending element that generates electrical power when deformed by fluid flow. The bending element is fixed to mounting means at one end and to a fin-like driving means at the other end.

U.S. Pat. No. 5,494,468, FLIPPER ENERGY SOURCE, describes a swim fin for generating electricity. The swim fin has a body which is placed under stress and deformed by water during the act of swimming. Piezoelectric devices are integrated into the swim fin body so that the deformation of the fin body generates electricity.

U.S. Pat. No. 6,011,346, APPARATUS AND METHOD FOR GENERATING ELECTRICITY FROM ENERGY IN A FLOWING STREAM OF FLUID, describes a conduit with a divider to which piezoelectric members are attached. The divider separates fluid flow into two paths, and a restrictor controls distribution of flow between the two paths. Differential pressure between the paths causes deformation of individual piezoelectric members, thereby generating electricity.

U.S. Pat. No. 6,424,079, ENERGY HARVESTING EEL, describes a power generator using an elongated, eel-like piezoelectric body that is moved by flowing water. The piezoelectric body is mounted to a spring mechanism, and moves in response to traveling vortices in the water, in a manner similar to a flag in the wind.

U.S. Pat. No. 6,433,465 B1, ENERGY-HARVESTING DEVICE USING ELECTROSTRICTIVE POLYMERS, describes a polymer material incorporated into the soles of footwear to produce energy. The resulting energy is either full-or partial-wave rectified and then, if desired, converted to a direct current (DC) voltage level for suitable battery charging.

U.S. Pat. No. 6,532,740 B1, GENERATOR EMPLOYING THE CORIOLIS EFFECT, describes a system for employing the Coriolis effect for the generation and storage of energy. The system includes a vortex chamber for rotational acceleration of superheated, supersaturated water vapor and heated air. A water intake assembly is adapted to deliver a directed flow of superheated water vapor to a lower portion of the vortex chamber while the air intake assembly is adapted to deliver a flow of heated air to the lower portion of the vortex chamber. The air intake assembly includes an electrical generator operable by airflow drawn from the air intake assembly.

U.S. Pat. No. 6,768,214, VIBRATION BASED POWER GENERATOR, describes a device with a member that is displaced in response to fluid flow in a vibratory manner. The displacement of the member is used to induce strain on a piezoelectric material, and thereby generate electricity.

U.S. Pat. No. 6,856,036 B2, INSTALLATION FOR HARVESTING KINETIC ENERGY OF OCEAN CURRENTS IN DEEPWATER, describes utilization of a semi-submersible platform and multiple, vertically oriented Darrieus-type hydraulic turbines with funnels. The turbines are located below sea level at a depth sufficient to isolate them from wave action. Electric power generators are located on a structure above water, and operate to provide electric power which is transmitted to the shore. One of the embodiments is designed to harvest energy from tidal currents in deepwater.

US 20060022555 A1, ENERGY HARVESTING SYSTEM, APPARATUS AND METHOD, describes a device that transforms acoustic energy into electrical energy for use by a sensor. The device utilizes a piezoelectric component which may be encased within an acoustic chamber. The acoustic chamber concentrates the acoustic energy.

US 20060063522 A, SELF-POWERING AUTOMATED BUILDING CONTROL COMPONENTS, describes a network of wireless radios for controlling operation of equipment, and locating assets and personnel. The wireless radios may be powered by energy generators that scavenge energy from the building, building equipment, or building environment. For example, the energy generators may utilize micro-electro-mechanical components or piezoelectric materials driven by vibrations. The energy generators may alternatively generate electrical energy from light, thermal, kinetic, radio frequency, movement or other forms of energy.

US 20050134149 A, PIEZOELECTRIC VIBRATION ENERGY HARVESTING DEVICE, describes a device having first and second masses, and first and second springs coupled to the first and second masses, respectively. A piezoelectric element is bonded between the first mass and the second spring, so that a stress applied to the second spring is applied to the piezoelectric element.

GB1116451 A, METHOD OF AND APPARATUS FOR TRANSMITTING ENERGY BY PRESSURE OSCILLATIONS IN A FLUID, describes a fluid-pressure apparatus with a branch duct of a gas or liquid-filled duct through which oscillations are transmitted by a mechanical oscillator to a receiver which is connected to a cylinder having an adjustable piston.

SUMMARY OF THE INVENTION

In accordance with an embodiment of the invention, apparatus for converting kinetic energy to electrical energy comprises: a housing with at least one wall defining an inner volume through which fluid is permitted to traverse from a first opening to a second opening; and at least two membranes attached to the housing, the membranes functioning together as a variable fluid flow restrictor between the first and second openings, and oscillating as a function of membrane stiffness and fluid flow force, the membranes being deformed during oscillation and generating electrical energy in response to being deformed. The electrical energy can be generated by having piezo electric components attached to the deforming membrane and transforming the fluid induced strain.

In accordance with another embodiment of the invention, a method for converting kinetic energy to electrical energy comprises: with a housing having at least one wall defining an inner volume through which fluid is permitted to traverse from a first opening to a second opening, and at least two membranes attached to the housing, forming a variable fluid flow restrictor between the first and second openings with the membranes, the fluid flow restrictor oscillating as a function of membrane stiffness and fluid flow force, and generating electrical energy in response to deformation of the membranes during oscillation. The electrical energy can be generated by having piezo electric components attached to the deforming membrane and transforming the fluid induced strain.

One advantage of the invention is that electrical energy can be produced from fluid flow in a remote environment. The energy harvesting device does not rely on a physical connection with a device at the surface for power. Further, because the source of kinetic energy is not dependent on a limited reservoir of fuel or battery power, the device can produce electrical energy continuously.

The invention also has specific advantages relative to some prior art techniques. For example, unlike U.S. Pat. No. 6,504,258, VIBRATION BASED DOWNHOLE POWER GENERATOR, at least one embodiment of the invention has relatively few moving parts. The a harsh downhole environment, moving parts are apt to fail. Further, because the invention operates based on deformation rather than vibration, problems associated with vibration, such as less secure anchoring and loosening of threaded fasteners is mitigated. Unlike U.S. Pat. No. 6,768,214, VIBRATION BASED POWER GENERATOR, at least one embodiment of the invention is not dependent upon turbulence because it utilizes membranes which form a variable funnel that oscillates as opposing Bernoulli Effect and fluid flow forces change over time. As a result, deformation and electrical energy production may be more controllable and predictable. Unlike U.S. Pat. No. 5,839,508, DOWNHOLE APPARATUS FOR GENERATING ELECTRICAL POWER IN A WELL, at least one embodiment of the invention does not require an electrical generator. An electrical generator may be problematic in a harsh downhole environment because it has relatively numerous moving parts which are prone to failure, including bearings and shaft seals.

Further features and advantages of the invention will become more readily apparent from the following detailed description when taken in conjunction with the accompanying Drawing.

DETAILED DESCRIPTION

The particulars described herein are by way of example for purposes of discussion of the illustrated embodiments of the present invention in order to provide what is believed to be a useful and readily understood description of the principles and conceptual aspects of the invention. No attempt is made to show structural aspects of the invention in more detail than is necessary for a fundamental understanding of the invention.

The invention may be implemented in various different embodiments of a device for converting kinetic energy from the surrounding environment into electrical energy. The embodiments are described below in the context of the source of kinetic energy being fluid flow through a borehole such as those associated with petrochemical wells. However, the invention is not limited to petrochemical wells.

Figure 1:
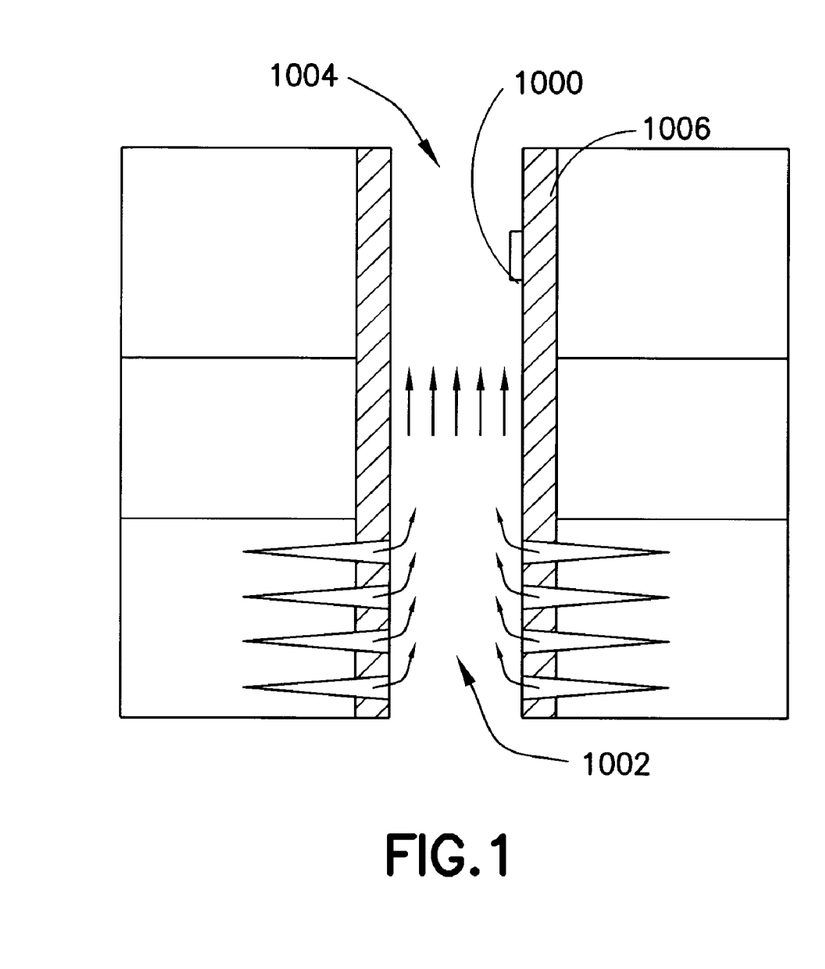
FIG. 1 illustrates an energy harvesting device deployed in a borehole.
Figure 2:
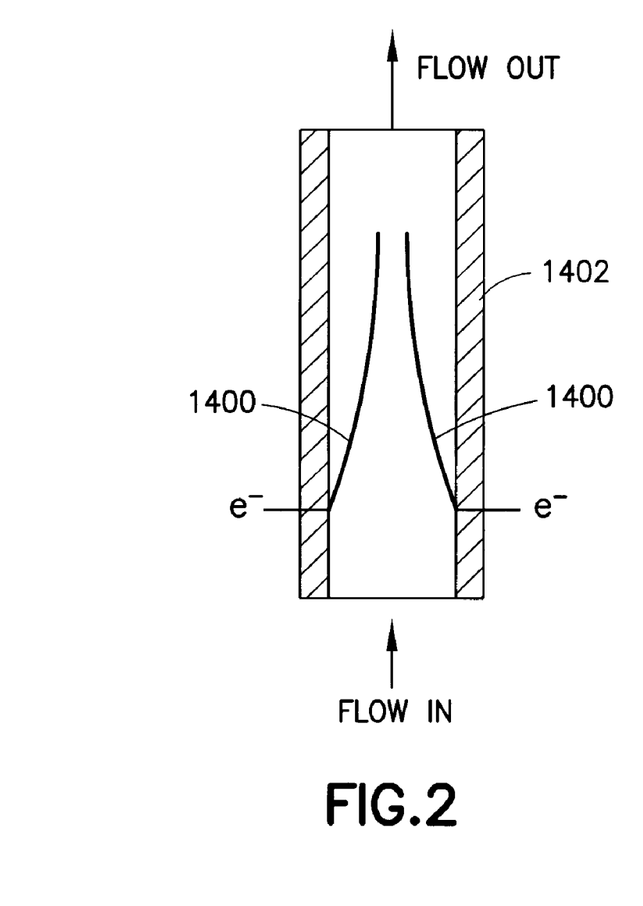
FIG. 2 illustrates the energy harvesting device of FIG. 1 in greater detail.
Figure 3:
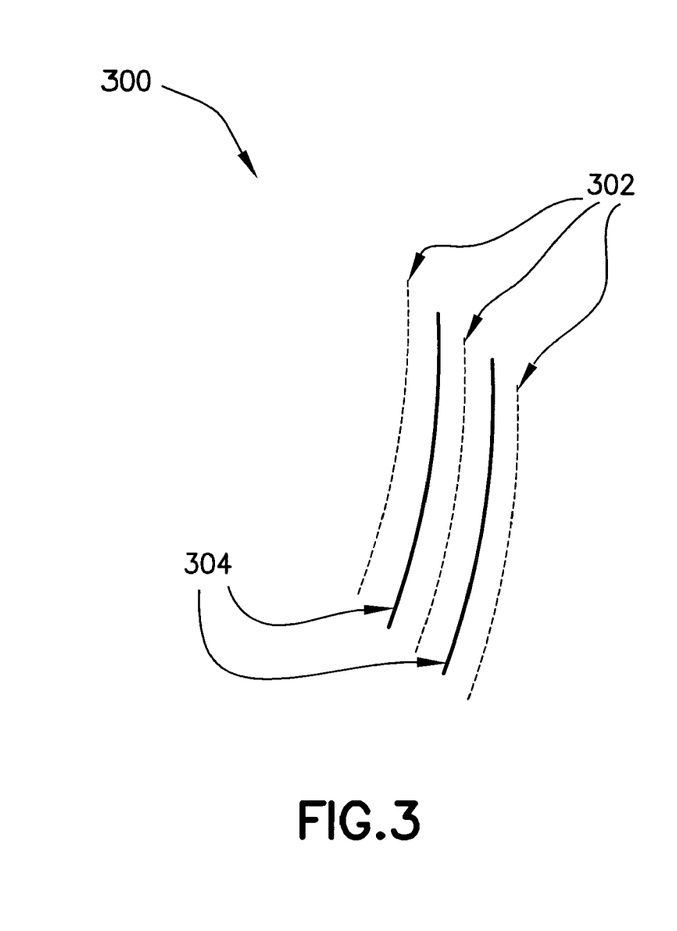
FIG. 3 illustrates a composite membrane.

Referring to FIGS. 1 through 3, an energy harvesting device (1000) converts the kinetic energy of a fluid flow (1002) in a borehole (1004) into electrical energy. The energy conversion is made from the hydraulic domain to the electrical domain by means of a piezo electric medium which comprises or is attached to the deforming membrane. For example, the electrical energy can be generated by having piezo electric components attached to the deforming membrane, and thus transforming the fluid induced strain into electrical energy. In the illustrated embodiment, fluid flows through a cylindrical (tubular) housing having an inlet and outlet. Kinetic energy associated with the fluid flow causes deformation of at least one membrane (1400) attached to the housing (1402) (shown in cross-section). In particular, the membrane is attached to the housing at one end, and protrudes into the fluid flowing within the housing at another, free end. The housing (1402) functions to guide the fluid flow, protect the membranes (1400) and other components, and provide a rigid structure via which the device can be attached to a casing (1006), tubing, or other part of a well completion.

The device operates based on at least one membrane repeatedly and predictably deforming in response to fluid flow through the housing. The membranes (1400) include sheets of material that generates a change in electrical voltage and current in response to being deformed. For example, the membranes may be constructed of piezoelectric polymer. The membrane sheets may also be constructed in a predetermined shape such that fluid flow is restricted in a predictable way, thereby inducing a desired range of deformation. Because the membrane (1400) protrudes into the flowing fluid, it interferes with fluid flow such that the free end of the membrane moves, i.e., deforms, relative to the attached end. The magnitude and polarity of deformation changes over time in an oscillatory manner. Consequently, kinetic energy from fluid flow is converted to a continuous flow of electrical energy via oscillatory membrane deformation. Electrical energy storage means may be provided to help accumulate the generated energy.

As shown in FIG. 3, the membranes (1400, FIG. 2) may be a composite membrane (300) including multiple laminated layers. Charge-generating layers (302) of the composite may be materials such as piezoelectric polymers that generate electrical charges due to deformation. The charge-generating layers (302) are separated by electrically insulating layers (304). The insulating layers may also provide particular mechanical strength characteristics, e.g., stiffness, to optimize the flow-induced deformation. Mechanical properties including membrane stiffness determine the natural harmonic vibration frequency of the membrane. Consequently, particular mechanical properties may be chosen for a given application such that the natural frequency of the membrane is in the range of the induced vibrations in the applied setting, resulting in membrane resonance and higher energy conversion efficiency. By using multiple layers of charge-generating materials in a single membrane it is possible to generate more power per membrane than a single layer membrane of the same material.

Figure 4:
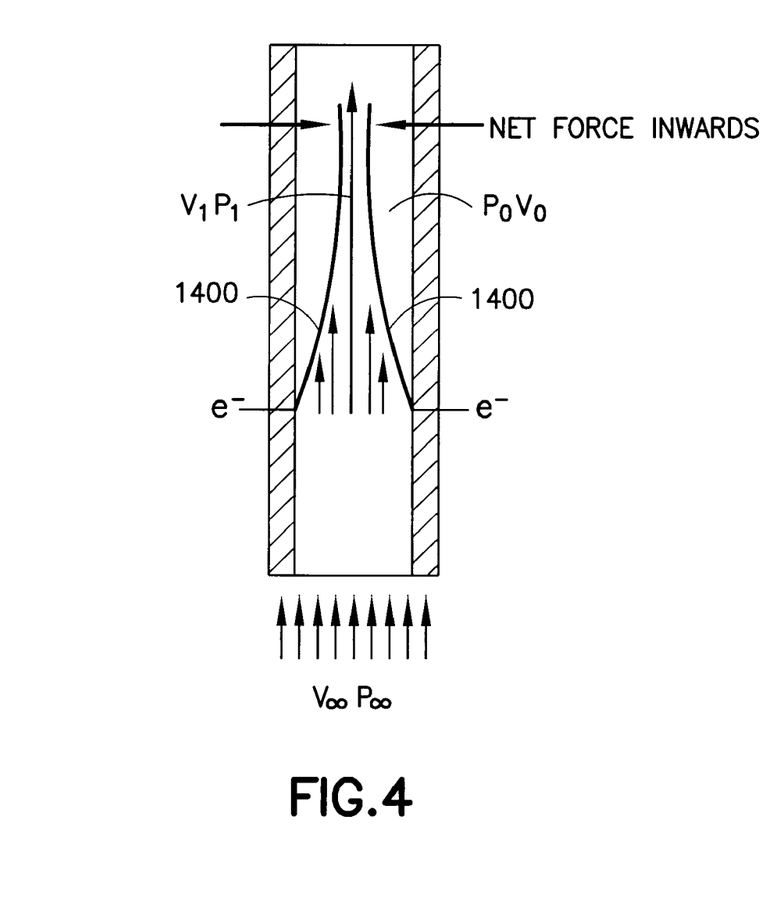
FIGS. 4 through 6 illustrate the position of the membranes of the energy harvesting device of FIG. 1 at various stages of an operation cycle.
Figure 5:
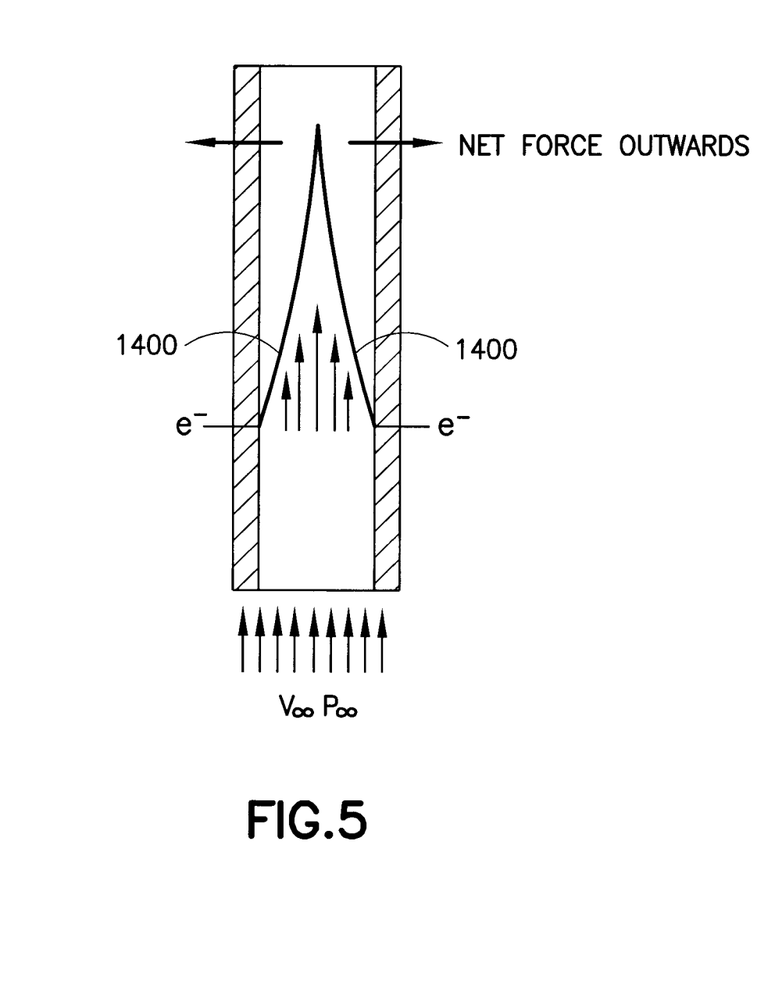
Figure 6:
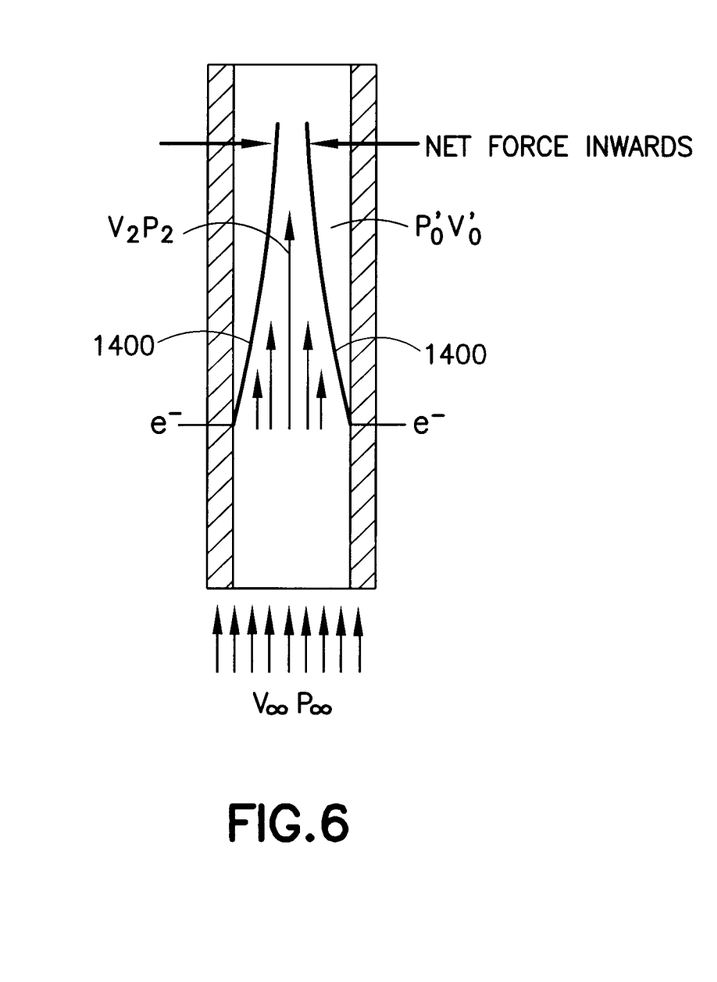

FIGS. 4 through 6 illustrate operation of the membranes (1400) in greater detail over a single oscillation cycle. The energy harvesting device is disposed in a fluid flow defined by pressure $P_\infty$ and velocity $V_\infty$. Due to the shape and arrangement of the membranes in the housing (1402), the membranes function as a flow restrictor funnel having a variably-shaped opening. The magnitude of flow restriction is a function of the area of the opening. At the beginning of a cycle, as illustrated in FIG. 4, the restriction of fluid flow causes the velocity ($V_1$) of the fluid flow inside the flow restrictor funnel to increase relative to the velocity ($V_0$) of the fluid flow outside the funnel. Because of the Bernoulli Effect, the pressure ($P_1$) inside the flow restrictor funnel is less than the pressure ($P_0$) outside the funnel. Consequently, the net force acting on the membranes is inward, causing the two membranes to move toward each other. When the membranes moves inward the area of the opening decreases, eventually to the point of closing the funnel opening as illustrated in FIG. 5. At the point of closing the fluid flow is so restricted that the counter-force of the fluid flow itself is greater than the inward Bernoulli Effect force, thereby moving the membranes outward away from each other and increasing the area of the funnel opening. In particular, the net force acting on the membranes is outward. As the funnel opening increases due to the outward motion of membranes as depicted in FIG. 6, the membranes are deformed and exert inward force due to the elasticity of the membrane material. Further, due to the fluid flow restriction caused by the funnel, the velocity ($V_2$) of the fluid flow inside the funnel becomes larger than the fluid flow velocity ($V_0'$) outside the funnel. Again, because of the Bernoulli Effect, the pressure ($P_2$) inside the funnel is less than the pressure ($P_0'$) outside the funnel. The net force acting on the membrane as a result of the combination of these two effects is inward, resulting in movement of the two membranes toward each other (see FIG. 4). The above-described movement of the membranes occurs cyclically, and continuously, as a function of fluid flow. Consequently, a continuous source of electrical energy is provided.

The power generated by the deforming-membrane energy harvesting device is characterized by the following equation:

$$W \sim A\rho V^3,$$

where
W is the power generated;
A is the area of the charge-generating material;
$\rho$ is the density of the charge-generating material; and
V is the velocity of the charge-generating material.

A and $\rho$ are known because they are defined by the design of the particular implementation of the energy harvesting device. V, which is related to the flow conditions inside the device and dependent on the density of the fluid ($\rho_f$) and the specific interior geometry of the device (which is known), can be derived from the equation above analytically or empirically. If the fluid density ($\rho_f$) is known, the flow velocity ($V_{f,in}$) inside the funnel can be estimated, or vice versa. The flow inside the funnel is induced by the flow outside the device. Therefore, some information about the local conditions of the fluid flow surrounding the device can also be derived if desired.

Figure 7:
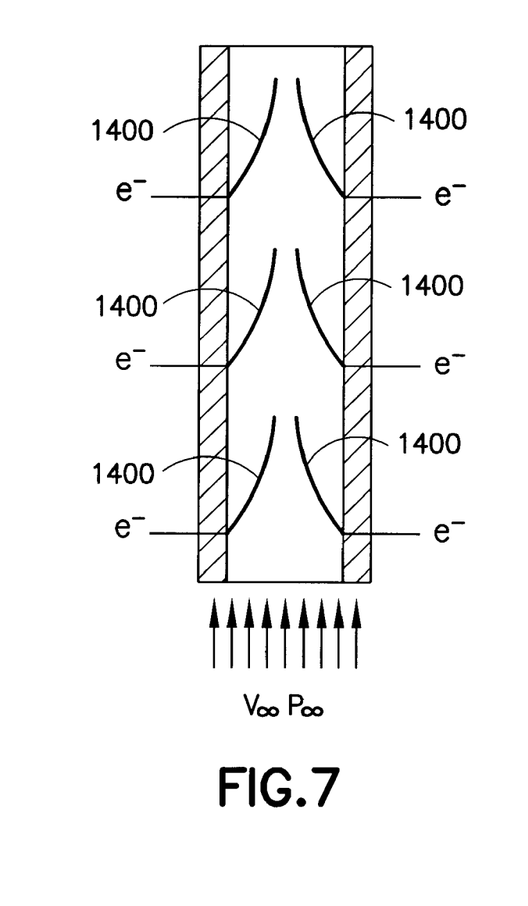
FIGS. 7, 8 and 9 illustrate alternative embodiments of the energy harvesting device of FIG. 1.

FIG. 7 illustrates an alternative embodiment of the deforming-membrane energy harvesting device. In this embodiment multiple sets of membranes (1400) are deployed in series in the flow path so as to generate more electrical power than a single set of membranes. The electrical energy from the sets of membranes can be combined via serial and parallel connections to provide a particular range of voltage and current.

Figure 8:
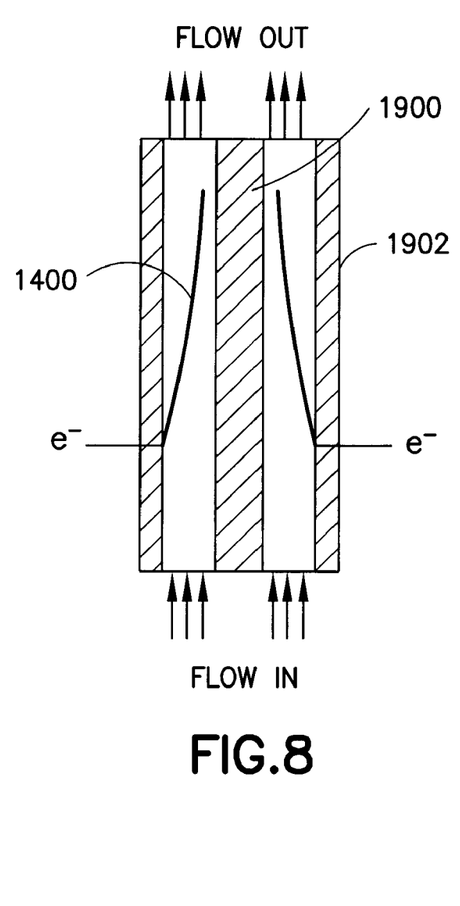
Figure 9:
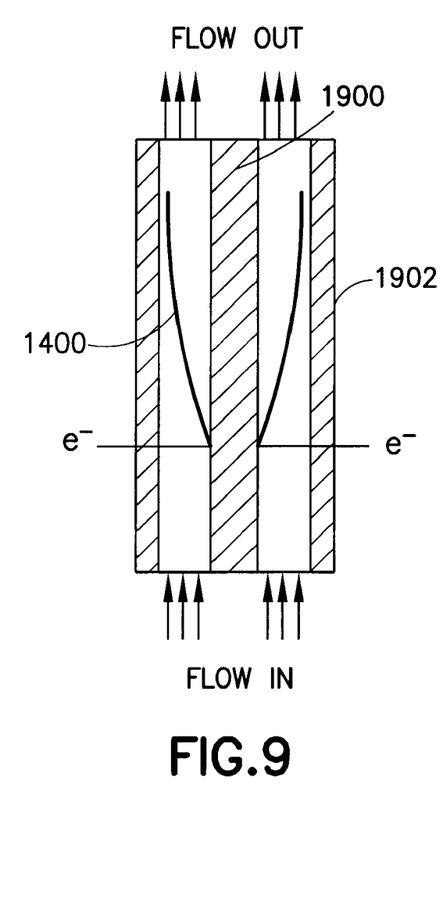
Figure 10:
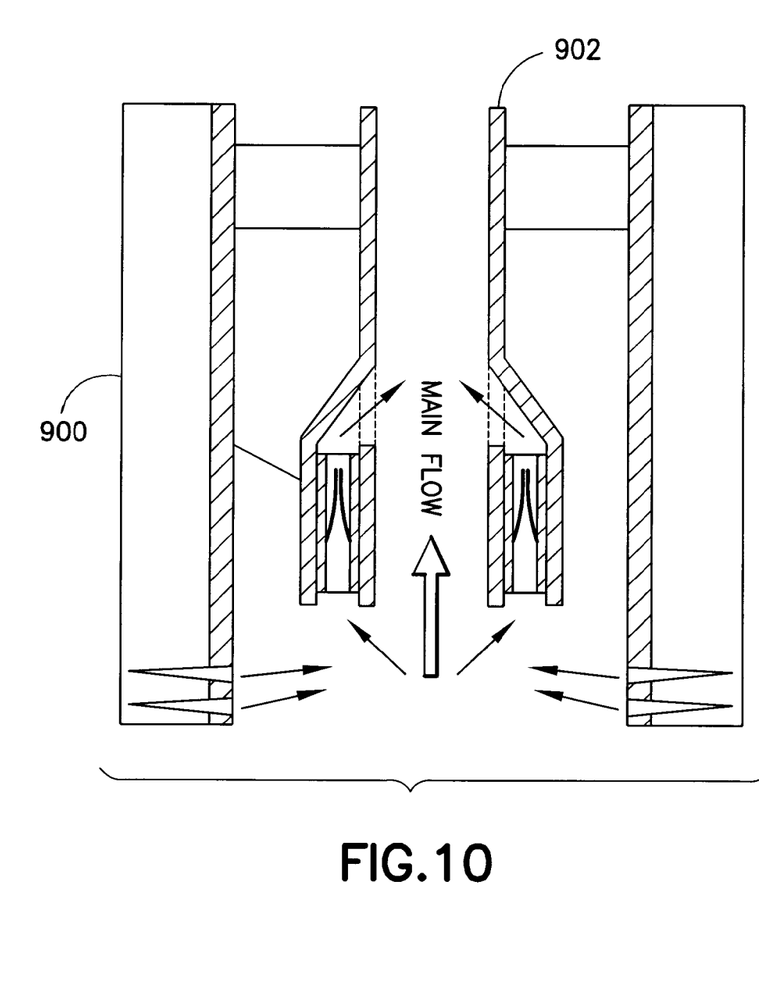
FIG. 10 illustrates deployment of the energy harvesting device of FIG. 1 in a side package.

FIGS. 8 and 9 illustrate another alternative embodiment. In the depicted embodiment the flexible membranes (1400) are disposed in an annular flow chamber. The annular flow chamber is defined by an inner tube or rod structure (1900) within an outer tube or casing that functions as a housing (1902). The membranes can be attached to either the housing or to the inner structure. FIG. 10 illustrates an alternative annular flow chamber (900) in which the center of the chamber is production tubing (902). An advantage of this variation is that the annular flow chamber does not obstruct the main flow path.

Figure 11:
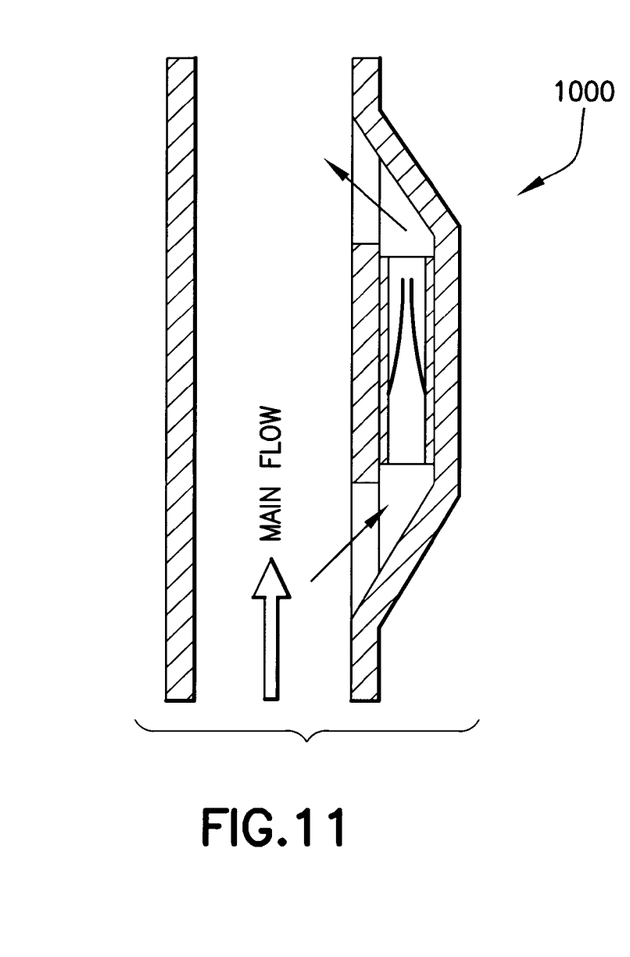
FIG. 11 illustrates deployment of an alternative embodiment of the energy harvesting device of FIG. 1 in an annular ring around the main flow channel.

Referring to FIG. 11, because placing the device in a main flow path may cause unacceptable disturbance of the flow, e.g., because of local turbulence accelerating corrosion or erosion of the local well completion, the device may alternatively be disposed in a secondary path, i.e., a "side package" (1000). The side package is embedded in the completion string as part of a casing or tubing. The side package helps maintain a clear path for future well intervention in which an operator might need to lower down instruments into the well.

Figure 12:
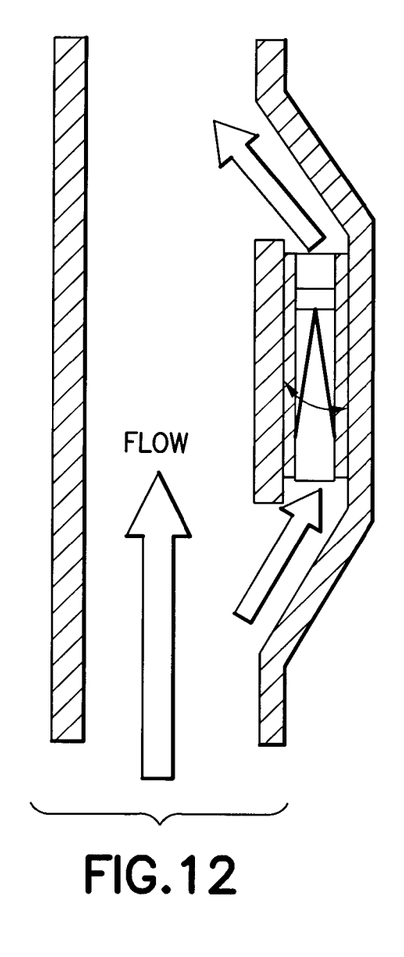
FIGS. 12 through 15 illustrate orientation of the energy harvesting device of FIG. 1 with respect to the direction of fluid flow.
Figure 13:
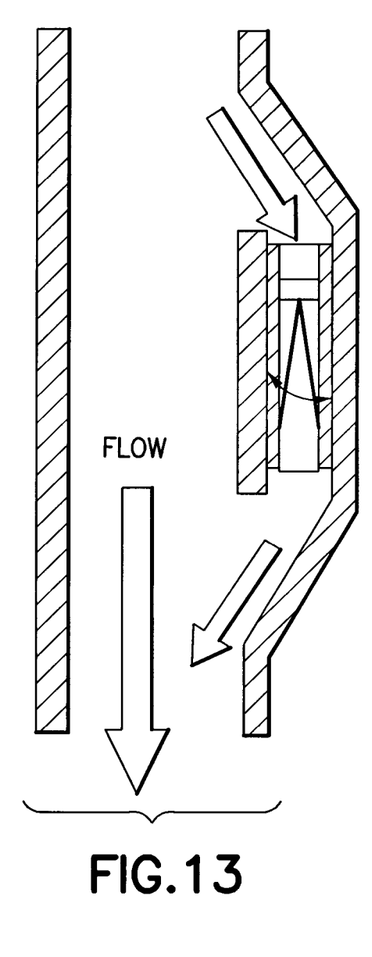
Figure 14:
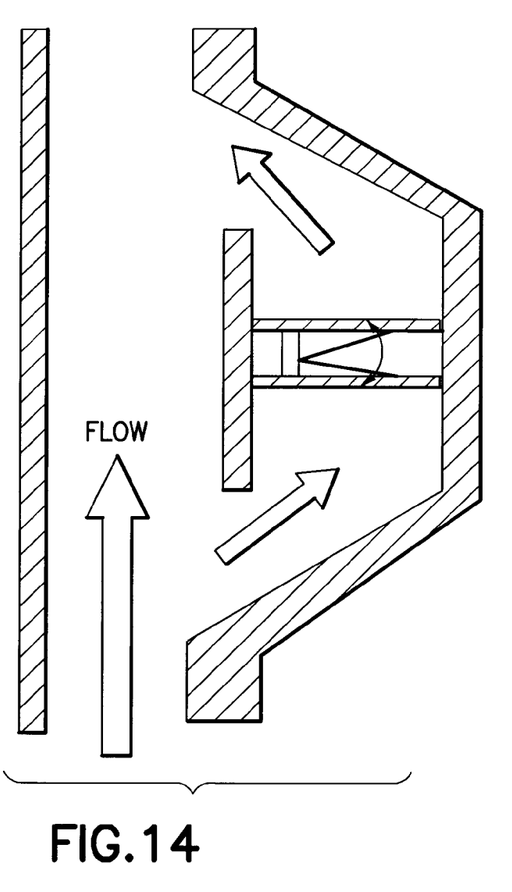
Figure 15:
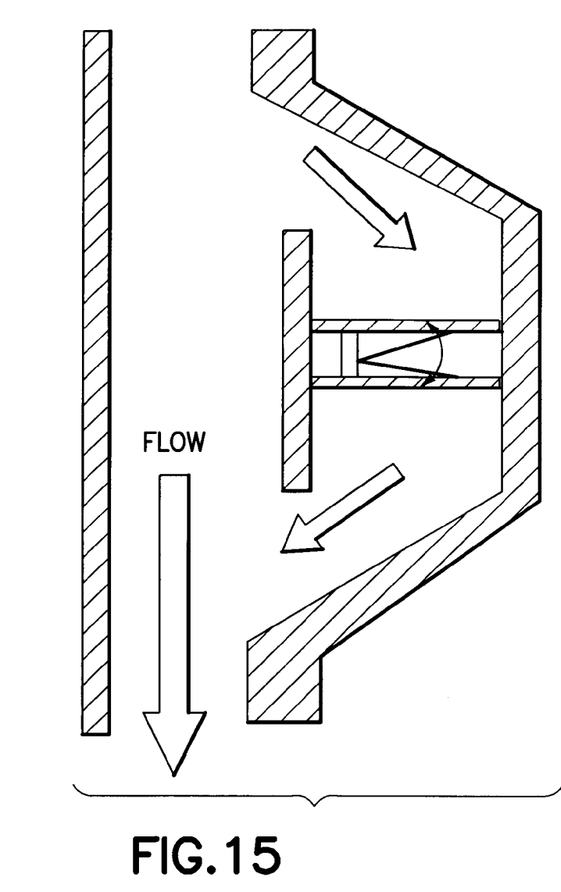

Referring now to FIGS. 12 through 15, various orientations of the energy harvesting device with respect to the fluid flow can be utilized. The device operates in accordance with the same basic principles of opposing forces varying the opening of a funnel regardless of the orientation. However, the particular motion of the membranes is in-part a function of the orientation. FIGS. 12 and 13 depict the energy harvesting device mounted such that an axis defined by the openings of the housing is parallel to the direction of fluid flow, and FIGS. 14 and 15 depict the energy harvesting device mounted such that the axis defined by the openings of the housing are perpendicular to the direction of fluid flow.

Figure 16:
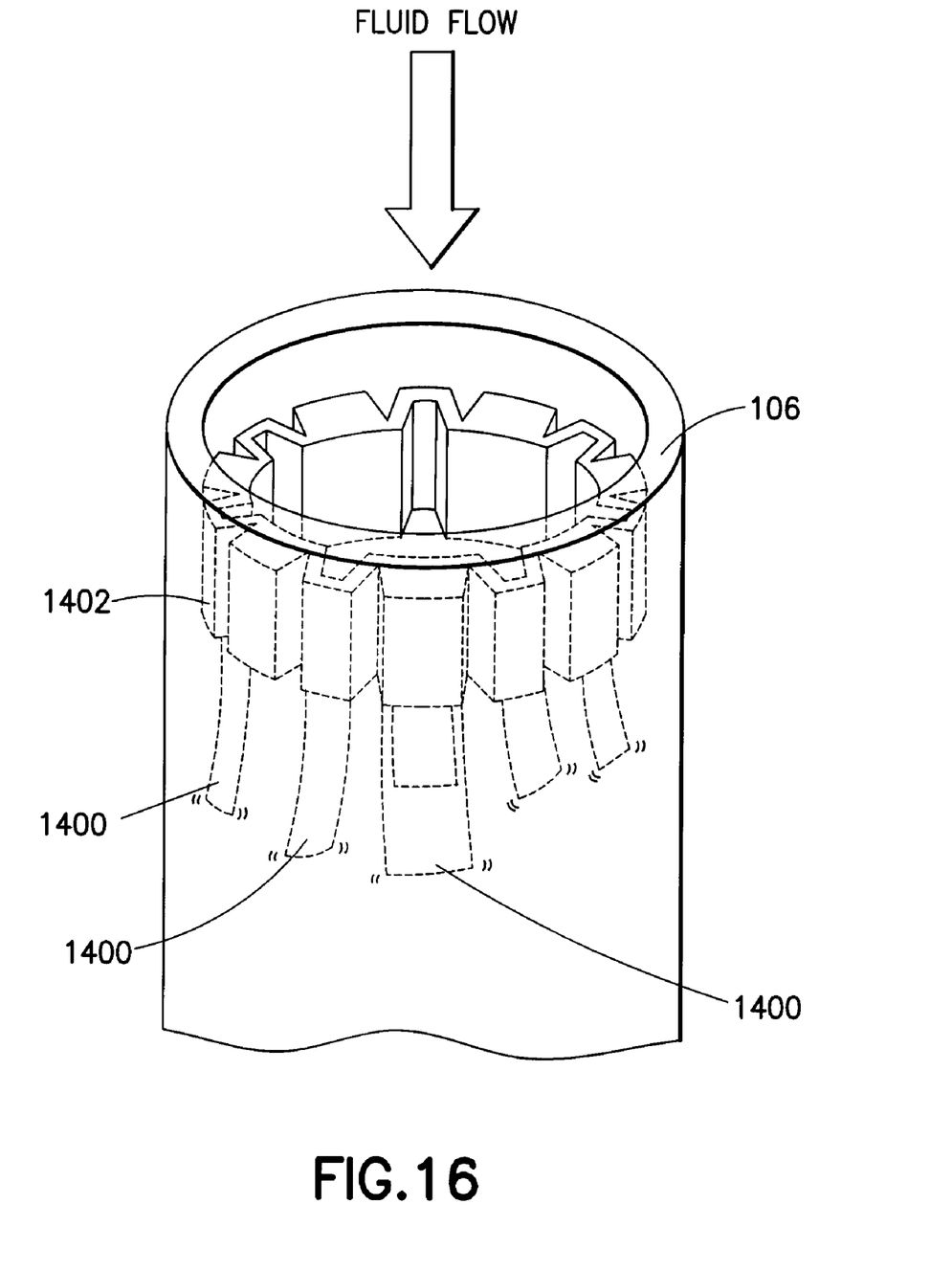
FIG. 16 illustrates an alternative embodiment of the energy harvesting device of FIG. 1 in which the deforming membranes are anchored with respect to the main casing or production tubing by means of a compliant ring or a deployable structure.

FIG. 16 illustrates another alternative embodiment. In this embodiment the energy harvesting device includes a set of membranes (1400) disposed in a ring. The ring of membranes are attached to a compliant, ring-shaped anchor member (1402) which fixes the position of the energy harvesting device relative to the tubing or casing wall (106). The anchor member (1402) is made from interconnected links of a resilient material, and exerts spring-like force when the ring diameter is decreased. As a result, a friction fit is formed between the anchor member and the wall. This embodiment may be a compliant device (CM) or a deployable structure (DS) depending on the expansion ratio required. The complaint device version could be left in place for long periods of time. Further, it could be easily retrieved by removing one of the links of the anchor member. The same functionality can be achieved with deployable structures instead of CMs, but DS versions tend to allow larger expansion ratios.

It should be noted that the application of any of the various embodiments of the invention described above is not limited to the production phase of natural resource recovery operations. For example, a significant amount of fluid energy is available during fracturing operations, and a similar device may be used for distributed sensor networks or other applications requiring energy downhole, based on the energy harvesting principles described above. Another possible application is to use the energy harvester inside an oil/gas pipeline.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for converting kinetic energy to electrical energy comprising:
   a housing with at least one wall defining an inner volume through which fluid is permitted to traverse from a first opening to a second opening; and
   at least two membranes attached to the housing at one end, the membranes functioning together as a variable fluid flow restrictor between the first and second openings, and oscillating as a function of membrane stiffness and fluid flow force, the membranes being deformed during oscillation and generating electrical energy in response to being deformed.

2. The apparatus of claim 1 wherein at least one piezo electric component is attached to at least one of the membranes.

3. The apparatus of claim 1 wherein each membrane includes one or a plurality of charge-generating layers.

4. The apparatus of claim 3 wherein adjacent charge-generating layers are separated by electrically insulating layers.

5. The apparatus of claim 4 wherein membrane stiffness corresponds to a predetermined natural frequency.

6. The apparatus of claim 1 including a plurality of sets of membranes arranged in series relative to fluid flow, each membrane set defining a variable fluid flow restrictor.

7. The apparatus of claim 1 wherein the housing is cylindrical.

8. The apparatus of claim 7 wherein the housing includes a central internal member that defines an annular flow path between the internal member and the wall, the membranes being disposed in the annular flow path.

9. The apparatus of claim 8 wherein the internal member is tubular.

10. The apparatus of claim 9 wherein the internal member is a production tubing.

11. The apparatus of claim 1 wherein the housing includes means to be secured to a side package of a completion string as part of a casing or tubing.

12. The apparatus of claim 1 wherein the housing includes a compliant ring-shaped anchor.

13. The apparatus of claim 12 including a plurality of membranes disposed around the ring-shaped anchor.

14. A method for converting kinetic energy to electrical energy comprising:
   with a housing having at least one wall defining an inner volume through which fluid is permitted to traverse from a first opening to a second opening, and at least two membranes attached to the housing at one end,
   forming a variable fluid flow restrictor between the first and second openings with the membranes, the fluid flow restrictor oscillating as a function of membrane stiffness and fluid flow force,
   and generating electrical energy in response to deformation of the membranes during oscillation.

15. The method of claim 14 including the further step of generating electrical energy with at least one piezo electric component which is attached to at least one of the deforming membranes.

16. The method of claim 15 including the further step of generating electrical energy with one or each of a plurality of charge-generating layers of each membrane.

17. The method of claim 16 including the further step of generating electrical energy from each of a plurality of separated adjacent charge-generating layers separated by electrically insulating layers.

18. The method of claim 17 including the further step of oscillating at a natural frequency corresponding to membrane stiffness.

19. The method of claim 15 including the further step of generating electrical energy with each of a plurality of sets of membranes arranged in series relative to fluid flow, each membrane set defining a variable fluid flow restrictor.

20. The method of claim 19 including the further step of the housing defining a central internal member that creates an annular flow path between the internal member and the wall, the membranes being disposed in the annular flow path.

21. The method of claim 20 including the further step of using a tubular structure as the internal member.

22. The method of claim 21 including the further step of using production tubing as the internal member.

23. The method of claim 15 including the further step of securing the housing to a side package of a completion string as part of a casing or tubing.

24. The method of claim 15 including the further step of mounting the housing via a compliant ring-shaped anchor.

25. The method of claim 24 including the further step of generating electrical energy with each of a plurality of membranes disposed around the compliant ring-shaped anchor.

26. Apparatus for converting kinetic energy to electrical energy downhole comprising:

a housing with at least one wall defining an inner volume through which wellbore fluid is permitted to traverse from a first opening to a second opening; and at least two membranes attached to the housing at one end, the membranes functioning together as a variable fluid flow restrictor between the first and second openings, and oscillating as a function of membrane stiffness and fluid flow force, the membranes being deformed during oscillation and generating electrical energy in response to being deformed.

27. The apparatus of claim 26 wherein mechanical properties of the membrane correspond to a natural frequency of the membrane oscillations and wherein the natural frequency of the membrane oscillations and a natural or induced flow fluctuation are in the same range.

28. The method of claim 14 including the further step of setting membrane mechanical properties such that a natural frequency of the membrane oscillation and a natural or induced flow fluctuation are in the same range.

* * * * *